June 15, 1943.  G. L. ATHERHOLT, SR., ET AL  2,321,789
CAM DEVELOPING MECHANISM
Filed Feb. 17, 1943  3 Sheets-Sheet 2

June 15, 1943.  G. L. ATHERHOLT, SR., ET AL  2,321,789
CAM DEVELOPING MECHANISM
Filed Feb. 17, 1943  3 Sheets-Sheet 3

INVENTORS.
George L. Atherholt, Sr.,
Enos P. Saunders,
Lewis P. Graham.
BY Harness, Dickey & Pierce.
ATTORNEYS.

Patented June 15, 1943

2,321,789

UNITED STATES PATENT OFFICE 2,321,789

CAM DEVELOPING MECHANISM

George L. Atherholt, Sr., Ferndale, Enos P. Saunders, Berkley, and Lewis P. Graham, Lake Orion, Mich., assignors to Triangle Engineering Company, Ferndale, Mich., a partnership composed of George L. Atherholt, Sr., Enos P. Saunders, and C. M. Smillie, Jr.

Application February 17, 1943, Serial No. 476,138

13 Claims. (Cl. 51—232)

This invention relates to cam developing or forming devices and has for its principal object the provision of a simple and efficient mechanism by means of which circular cams having a constant rise and/or a constant fall may be accurately formed in a simple, quick, and efficient manner.

Objects of the invention include the provision of apparatus for forming or developing cams having a constant rise or fall and which may be adjusted to form cams requiring different amounts of rise and fall and cams in which the rise or fall occurs during different angular extents of rotary movement of the cam; the provision of apparatus of the type described in which the work is adapted to be mounted upon an arbor which is rotated to present different portions of the periphery of the work to the forming tool; the provision of apparatus of the type described in which the essential movements of the work supporting arbor are controlled through relative movements of parts slidably associated with each other for movement in straight lines; the provision of apparatus of the type described in which the rotation of the work and its relative position with respect to the path of movement of the tool controlling the rise or fall of the cam surfaces thereof are controlled through adjustment of the angularity of relatively movable parts slidable with respect to each other in straight lines with respect to the movement of other parts of the apparatus along straight lines; and the provision of apparatus of the type described that is simple in construction and by the use of which cams having constant rises and falls may be formed with extreme accuracy.

A further object is to provide cam forming apparatus capable of adjustment to form cams having one or more cam surfaces of any desired angular extent and of any desired rise or fall, and in which the adjustment required to provide for any desired angular extent of cam surface is directly readable in degrees and the adjustment required to provide for any desired rise or fall is directly readable in parts of a unit of linear measurement.

The above being among the objects of the present invention the same consists in certain novel features of construction and combinations of parts to be hereafter described with reference to the accompanying drawings, and then claimed, having the above and other objects in view.

In the accompanying drawings which illustrate a suitable embodiment of the present invention and in which like numerals refer to like parts throughout the several different views.

This invention relates to so-called circular cams, that is cams which are adapted to rotate about an axis and in which the peripheral surface of the cam varies in radial distance from the axis of rotation thereof and is adapted to engage a cam follower or the like to impart a desired movement thereto. It further relates to such cams having a constant rise or fall.

In the manufacture of cams of the above described character it has heretofore been the practice, except where a relatively large number of identical cams have been formed, to lay out each cam individually upon the desired blank, rough out the cam to approximately the size and shape determined by the layout as best possible, and then bring the cam to its final size and shape primarily by hand filing and finishing. Such method of manufacturing cams is, of course, relatively expensive and it will be appreciated that the ability of the workman to properly lay out the shape of the cam on a blank and his ability to work the metal to the lines thus laid out are more or less variable factors depending upon the skill of the workman, and the final product invariably varies from the exact shape and size of the desired final cam to a greater or lesser extent. Machines which have heretofore been designed to mechanically form or develop such cams where the number of cams required admits the expense of such machine, have been more or less complicated and costly and are not readily variable to accommodate their ready use to the forming or developing of cams having cam surfaces of different angular extent and different amounts of rises or falls.

In accordance with the present invention a cam forming or developing device is provided by means of which cams of the type described may be quickly and accurately formed. It is adaptable for so-called mass production but is equally readily adaptable to production of one or more different cams having any desired angular extent of cam surface and having any desired amount of rise or fall over such cam surface within, of course, reasonable limits. It is, therefore, ideally adapted for use where cams having different angular extent of cam surfaces and different extents of rise or fall are required to be made in a relatively quick and extremely accurate manner, it being readily adjustable to quickly adapt it to the formation of a cam of desired angular extent of cam surface and predetermined amount of rise or fall as may be required in any particular case.

The apparatus shown in the accompanying drawings is a simplified and more or less diagrammatic representation of apparatus constructed in accordance with the present invention, such simplified showing being preferred for the purpose of ease of description and understanding. In other words it will be appreciated that the actual form of apparatus constructed in accordance with the present invention and which may constitute a commercially desirable form of such apparatus may vary considerably from that shown, but regardless of such changes the essential features and principles of operation will be substantially identical to the apparatus shown in the drawings.

Figure 1:
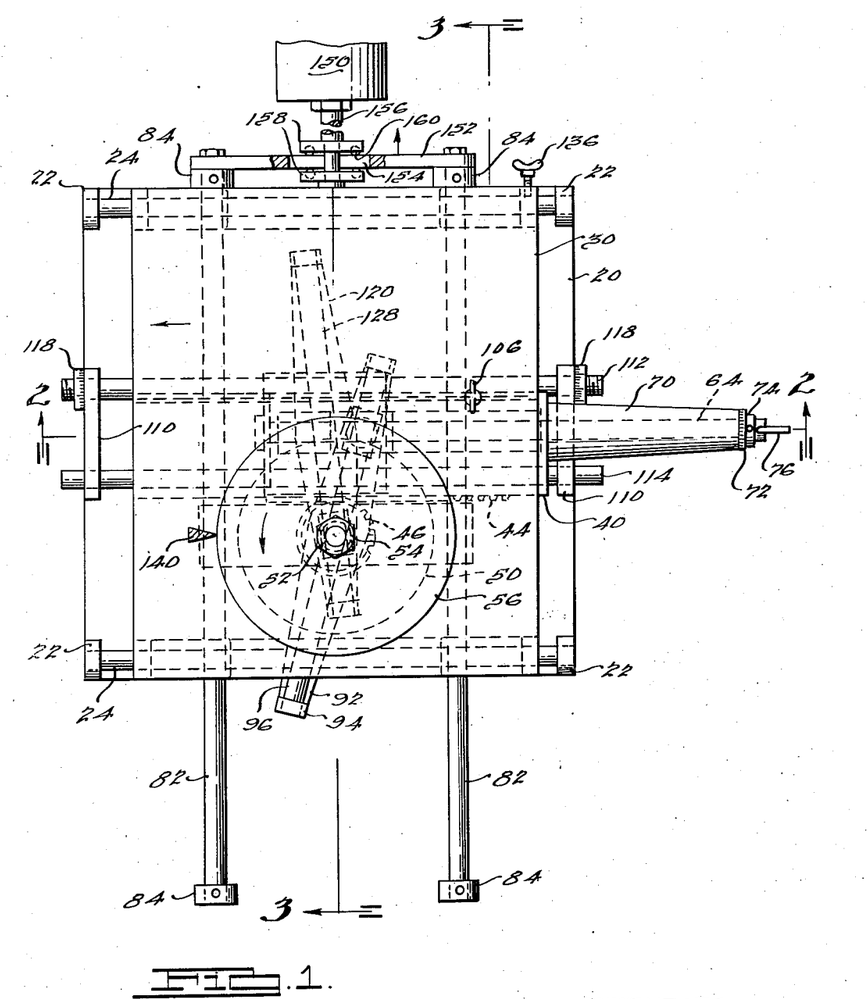
Fig. 1 is a partially broken, front elevational view of apparatus embodying the principles of the present invention and constructed in accordance therewith.

Referring to the accompanying drawings it will be seen that the apparatus comprises a supporting part in the form of a generally rectangular plate member 20 positioned at the rear thereof as viewed in Fig. 1. In the drawings the plate member 20 is illustrated as positioned with the plane of its thickness vertical. It will thus be considered in the following description although it will be understood that the apparatus will function equally as well whether the plane of thickness of the member 20 is vertical, horizontal, or inclined. At each of its four corners the plate member 20 is provided with a forwardly projecting ear 22 preferably integral therewith. Extending between and fixed with respect to the upper ears 22 is a cylindrical rod 24 and a similar rod extends between and is secured to the lower ears 22. As brought out in Figs. 2 and 3 the rods 24 are spaced well forwardly of the forward face of the plate member 20.

Forwardly of the plate member 20 and in well spaced relation with respect thereto is what may be termed a face member 30 which is of substantially the same height as the plate member 20 but of appreciably less width. It is shown in the form of a generally rectangular casting having a rearwardly extending arm 32 at each corner thereof, the arms 32 extending back to the corresponding rods 24 and there each being provided with an opening therein in which the corresponding rods are relatively closely but relatively slidably received. The face member 30 being of less width than the plate member 20 it is, therefore, supported for slidable movement transversely of the plate member 20 within the limits allowed by the clearance provided between the ears 22 and the arms 32 axially of the rods 24.

Figure 3:
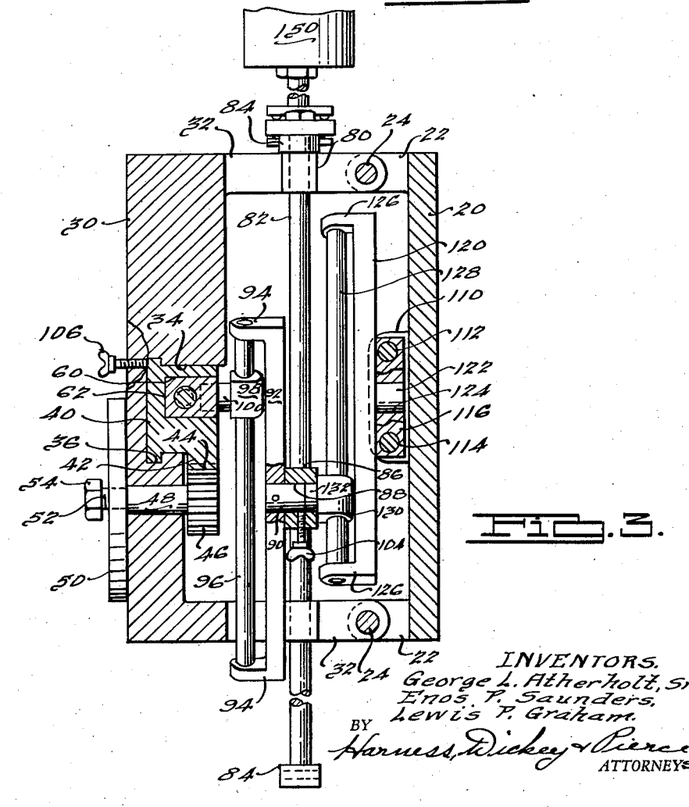
Fig. 3 is a partially broken, vertical, transverse sectional view taken on the line 3—3 of Fig. 1 and in which certain of the parts have been left in side elevation to better illustrate the construction of the same.

The face member 30 is relatively thick, the upper half thereof being considerably thicker than the lower half thereof as best brought out in Fig. 3, and approximately midway between its upper and lower edges it is provided in its rear face with a transverse groove 34, best shown in Fig. 3, the sides of which grooves are undercut as at 36 adjacent the bottom or forward face of the groove. Slidably received in the groove 34 is a slide member 40 a portion of which is complementary in cross-sectional configuration to the cross-sectional configuration of the groove 34 and its undercut portion 36 so as to be maintained against lateral and vertical movement therein. Adjacent its rear edge the slide 40 has a downward extension 42 which lies immediately back of the inner face of the thinner lower portion of the face member 30 and its lower edge is formed to provide a horizontally extending downwardly facing gear rack 44. This rack 44 lies in mesh with a spur gear 46 fixed to a shaft 48 which is rotatably mounted in the face member 30 and projects forwardly therethrough and on the outer face of the face member 30 is provided with a platten 50 upon which the work is adapted to be mounted as, for instance, by means of a stud or mandrel 52 and nut 54. In Fig. 1 the work is shown in blank form as a disc 56 which is centrally apertured to closely receive the mandrel 52 and secured against relative rotation to the platten 50 by means of the nut 54. It will be appreciated that movement of the slide 40 transversely of the face member 30 will, because of the interengagement of the rack 44 with the spur gear 46, cause rotation of the shaft 48 and consequently any work such as 56 which is mounted upon the platten 50.

Figure 2:
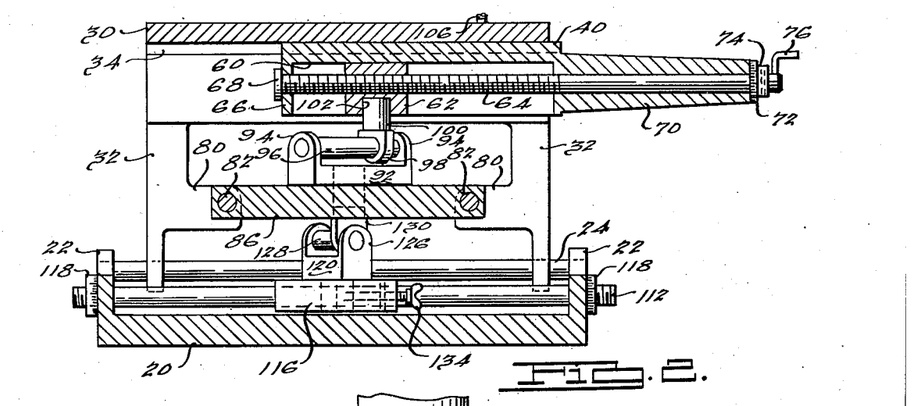
Fig. 2 is a horizontal sectional view taken on the line 2—2 of Fig. 1 and in which certain parts have been left in elevation to better show the construction of the same.

The above described transverse movement of the slide 40 with respect to the face member 30 is controlled in the following manner: The rear face of the slide 40, as best brought out in Figs. 2 and 3, is centrally grooved as at 60 in the direction of its length and slidably received in such groove is a nut member 62. The position of the nut member 62 longitudinally of the groove 60 is controlled by means of a screw 64 which is located centrally of the groove 60 and arranged with its axis parallel to both the grooves 60 and 34. The screw 64 threads through the nut 62 and at its inner or lefthand end as viewed in Fig. 2 is rotatably supported in the end wall 66 of the groove 60 and exteriorly thereof is provided with an enlarged head 68 limiting movement of the screw to the right as viewed in Fig. 2. The righthand end of the slide 40, as viewed in Figs. 1 and 2, is provided with an extension 70 in which the corresponding end of the screw 64 is rotatably received and beyond the righthand end of which the screw projects. Preferably the projecting righthand end of the screw is provided with a circular indicator 72 fixed for equal rotation therewith cooperating with a suitable mark (not shown) at the outer end of the extension 70 and which indicator 72 is calibrated to read in degrees or parts thereof. This is an important feature of the invention and will be more fully described later. The indicator 72 is followed by a nut or ring 74 fixed against axial movement with respect to the screw 64 so as to limit axial movement of the screw 64 to the left as viewed in Figs. 1 and 2, and thus cooperates with the head 68 to prevent axial movement of the screw 64 in the slide 40. A handle 76 or the like is preferably secured to the outer end of the screw 64 to facilitate turning of the same.

Each arm 32 approximately midway between the face member 30 and the support 20 is provided with an inwardly projecting ear or lug 80, preferably formed integrally therewith, such lugs 80 on the upper arms 32 being arranged in opposed relationship with respect to each other and such lugs 80 on the lower arms 32 being similarly positioned. As best shown in Fig. 2, a vertically extending rod 82 is slidably received and guided by the two lugs 80 at each side of the machine, the rods 82 thus being arranged in parallel and laterally spaced relation with respect to each other. As indicated in Figs. 1 and 3 the rods 82 are of materially greater length than the vertical dimensions of the face member 30 and plate member 20 and are, therefore, vertically slidable with respect thereto for a material distance without becoming disengaged from the lugs 80. Collars 84 or similar stop means are preferably fixed to the opposite ends of the rods 82 so as to limit axial movement of the rods 82 in both directions by engagement thereof with the corresponding lugs 80.

A horizontally extending bar member 86 located between the upper and lower arms 32 extends between the rods 82 and is fixedly secured thereto and is, therefore, vertically movable with the rods 82. As best brought out in Fig. 3 the bar 86 midway between its ends is provided with a transverse bore 88 therethrough arranged with its axis perpendicular to the plane of thickness of the plate member 20.

Rotatably supported in the outer or forward portion of the bore 88 is a cylindrical post 90 which is centrally fixed to an elongated base or support 92 each end of which has integrally secured thereto a forwardly extending bracket portion 94. Extending between the bracket portions 94 in forwardly spaced relation to the supporting portion 92 and in axially parallel relation with respect to a plane including the axes of the rods 82 is a cylindrical slide bar 96. The slide bar 96 slidably receives thereon an eye slide 98 which has integrally formed thereon a forwardly projecting short cylindrical post 100. The post 100 is rotatably received in a complementary bore 102 formed in the rear face of the nut 62. The slide bar 96 is, of course, swingable as a whole about the axis of the post 90 in the bore 88 of the cross-bar 86 and in accordance with the present invention means are provided for releasably locking the post 90 in rotatably adjusted position about the axis of the post 90 and bore 88, such means being more or less diagrammatically illustrated in the drawing as consisting of a thumb screw 104, best brought out in Fig. 3, which is threaded into the cross-bar 86 as shown so as to enable its inner end to engage and lock the post 90 against rotation in the bore 88.

From the description thus far given it will be appreciated that if the slide bar 96 is turned to a vertical position and locked in such position, vertical movement of the rods 82 carrying the cross-bar 86 vertically therewith will cause the eye slide 98 to simply slide up and down on the slide bar 96 without causing any relative lateral movement of the same with respect to the machine and, consequently, the slide 40 will remain in its then laterally adjusted position so that no relative movement of the slide 40 and spur gear 46 will occur to cause rotation of the work carrying platten 50.

It will also be appreciated that if the slide bar 96 is not adjusted into parallelism with the rods 82 but is, for instance, disposed at an angle thereto as illustrated in Figs. 1, 2 and 3, and the thumb screw 104 is tightened to lock the slide bar 96 in such angularly adjusted position, then if the rods 82 are raised from the position illustrated in Fig. 1, for instance, the cross-bar 86 in raising with the rods 82 will carry the slide bar 96 upwardly therewith. The eye slide 98, however, cannot move upwardly and, as a consequence, as the slide bar 96 moves upwardly the eye slide 98 will be caused to move laterally or transversely with respect to the face member 30 and, acting through the post 100, nut 62 and screw 64, will in event the face member 30 is constrained against equal movement on the rods 24 cause the slide 40 to correspondingly move transversely of the face member 30, the movement of the latter acting through the rack 44 and spur gear 46 to rotate the shaft 48 and consequently the work platten 50 together with any work that may be fixed thereto.

From the above description it will be appreciated that the extent of transverse movement of the slide 34, and consequently the amount of rotation imparted to the work carrying platten 50 during a full stroke of the rods 82 and cross-bar 86 in one direction will depend upon the angularity of the slide bar 96 with respect to the rods 82, as viewed in Fig. 1, and that the direction of movement of the slide 40 will depend upon which way, that is in a clockwise or counterclockwise direction of movement, the slide bar 96 is swung from its central or neutral position. It will also be appreciated that with the slide bar 96 set at the same angle with respect to the rods 82 during both an upward and downward movement of the cross-bar 86, the slide 40 will be caused to move transversely of the face member 30 in one direction during upward movement and in the opposite direction during downward movement of the cross-bar 86. Preferably the relation of parts is such that when the slide bar 96 is set at an angle of 45 degrees to the axis of the rods 82, as viewed in Fig. 1, a sufficient amount of transverse movement will be imparted to the slide 40 to cause the work carrying platten 50 to rotate through 360 degrees.

It will be appreciated from the above description that when it is desired to vary the angularity of the slide bar 96 with respect to the axes of the rods 82, if the thumb screw 104 is loosened to permit rotation of the post 90 in the bore 88 and the slide 40 is held against movement in the face member 30 while the eye slide 98 is at one end of the slide bar 96, then upon rotation of the screw 64 the nut 62 in moving in either one direction or the other will act through the eye slide 98 to cause the slide bar 96 to be swung about the axis of the post 90. This feature is employed to adjust the angularity of the slide bar 96 when required and upon such adjustment being completed the thumb screw 104 is tightened up to lock the slide bar in such adjusted position and the slide 40 is then released for relative sliding movement in the face member 30. Any suitable means may be provided for temporarily locking the slide 40 against sliding movement in the face member 30 under such conditions, a thumb screw 106 threaded through the front face of the face member 30 and into the groove 34 for the slide 40 being shown for more or less diagrammatically illustrating such means.

It is to be noted that the slide bar 96 is of such length that even when placed at its maximum angle, here considered to be 45 degrees by way of explanation, the eye slide will not travel sufficiently far in either direction to strike the arms 94 at either end thereof during a complete reciprocatory movement of the rods 82. Consequently, in making the above adjustment there will be no possible interference between the eye slide 98 and the arms 94.

With the apparatus thus far described it will be appreciated that means are provided for rotating the work supporting platten 50 in either direction of rotation upon reciprocation of the rods 82 in either direction; that the amount of reciprocation of the work supporting platten 50 for each full reciprocatory movement of the rods 82 up to a full or complete rotation of 360 degrees may be readily obtained by simply varying the angularity of the slide bar 96 with respect to the rods 82; that the angular position of the slide bar 96 may be readily changed by tightening the thumb screw 106 and loosening the thumb screw 104 and turning the screw 64 in the proper direction until the desired angularity of the slide bar 96 has been obtained, upon which the thumb screw 106 is loosened and the thumb screw 104 tightened; and that the adjustment in the angularity of the slide bar 96 is accomplished by simply rotating the screw 64 such an amount and in such a direction that the desired angle of rotation of the work is read directly from the indicator 72.

In connection with the above described adjustment of the slide bar 96 the importance of calibrating the indicator 72 in degrees will now be explained. First, it is to be kept in mind that each time the rods 82 are reciprocated they are reciprocated to the full extent of their movement, and when the slide bar 96 is set at some arbitrary maximum value, herein considered to be 45 degrees, during a complete reciprocation of the rods 82 the slide 40 will cause the platten 50 to rotate through 360 degrees. It will be appreciated from this that the amount of movement of the eye slide 98 transversely of the face member 30, while the eye slide 98 is moving longitudinally of the slide bar 96, is directly proportional to the angularity of rotation of the platten 50. For instance, and as a matter of illustration only, let it be assumed that when the slide bar 96 is disposed at an angle of 45 degrees with respect to the vertical and as viewed in Fig. 1 a complete reciprocation of the rods 82 in one direction will cause the eye slide 98 and consequently the slide 40 to travel across the face of the front member 30 a distance of ten inches and that in travelling this ten inches the platten 50 will turn through an angle of 360 degrees. From this it will be appreciated that if the slide bar 96 is positioned at such angle that the slide 40 will move only one inch during a complete reciprocation of the rods 82, then the platten 50 will rotate through one one-tenth of the angle that it would have traveled if the slide bar 96 had been set at 45 degrees, and under the conditions assumed in this particular instance, will rotate only through 36 degrees. Consequently, the amount of rotation of the platten 50 during any complete reciprocatory movement of the rods 82 will bear the same relationship to 360 degrees as the actual transverse movement of the eye slide 98 with respect to the face member 30 bears to that amount of transverse movement of the eye slide 98 required to rotate the platten 50 through 360 degrees.

This fact may be taken advantage of so that the dial 72 in being moved during adjustment of the bar 96 may be made to read directly in degrees corresponding to the amount of rotation of the platten 50 during a complete reciprocation of the rods 82. In other words, let it be assumed that it is desired to rotate the platten 50 through an angle of 36 degrees and that a ten inch transverse travel of the eye slide 98 will rotate the platten through 360 degrees as above assumed and that, therefore, in this case the eye slide 98 will be required to move transversely of the face member 30 a distance of one inch. If the eye slide is brought to one limit of its slidable position on the slide bar 96 and the slide bar is in a vertical position, then if the thumb screw 106 is tightened and the thumb screw 104 is loosened and the screw 64 is turned to shift the nut 62 a distance of one-half an inch the slide bar 96 will be positioned at the required angle to effect the desired one inch transverse movement of the eye slide 98 during a complete reciprocation of the rods 82, and the platten 50 will be rotated through an angle of 36 degrees upon such reciprocation. The reason that the nut 62 is only moved a half inch under such circumstances is that the slide bar 96 is swung about its center point represented by the axis of the post 90 and the nut 62 is thus required to be moved only one-half of the total distance which the eye slide 98 is to be shifted.

With the above in mind it will be appreciated that the half inch of travel of the nut 62 will require a predetermined number of turns of the screw 64 to effect the same. For instance, and by way of example only, if the screw 64 has thirty-six threads per inch then each complete rotation of the screw 64 would represent two degrees of movement of the platten 50 and the dial 72 could be divided up to read in minutes or multiples of minutes adding up to two full degrees over the circumference thereof. In view of this and under the condition assumed that it is desired to set the slide bar 96 at such an angle as to produce a 36 degree angular movement of the platten 50, then when the slide bar 96 is in vertical position and the screw 64 turned to indicate a movement of 36 degrees thereof on the dial 72, the slide bar 96 will have been set at the required angle. Any other desired angular value of rotation of the platten 50 can, of course, be similarly set through rotation of the screw 64 as directly indicated by the indicator 72.

It is not necessary, of course, that the slide bar 96 be brought to a vertical position each time it is desired to set the slide bar 96 at a new angle to correspond with a desired new angular movement of the platten 50, for it will be appreciated that if the existing angle of the slide bar 96 is known it may be advanced or retracted the required difference in degrees by rotation of the screw 64 and as indicated directly on the indicator 72 to obtain the desired setting.

This ability to set the slide bar 96 at any angle required to rotate the platten 50 through a desired angular movement by rotating the screw 64 through the identically same angle as read from the indicator 72 is of major importance in that it eliminates the need of any calculations, preparation and use of charts, or the like, in adjusting the machine to obtain a predetermined angular movement of the platten 50 during any particular phase of movement including a complete reciprocation of the bars 82 in either direction.

Any desired form of cutting tool may be employed to operate upon the work such as a milling cutter, grinding wheel, shaper cutter, nibbler cutter, or the like. Where a milling cutter or grinding wheel is employed its axis of rotation may be either perpendicular to or parallel with the axis of rotation of the shaft 48 or at an angle thereto but where a shaper or nibbler is employed for the forming operation and the peripheral edge of the cam is to be parallel to the axis of rotation of the cam the path of movement of the tool is preferably parallel to the axis of the shaft 48. In any event it will be appreciated by those skilled in the art that the contour of the operative cutting edge of the cutting tool should preferably duplicate the contour of the face of the cam follower which is to engage the cam in actual practice so as to obtain the exact contour of the cam required to give the desired movement of the follower.

The description so far given has been limited to the construction and operation of that part of the machine designed to rotate the work so as to bring the various peripheral portions thereof into a position to be operated upon by the cutting tool. In order to obtain the necessary rise and fall of the cam surfaces it is, of course, necessary to vary the relative position of the work with respect to the cutting tool measured in a direction radial with respect to the axis of rotation of the work. The added mechanism provided for this purpose will now be described.

The plate or supporting member 20 at each side thereof and intermediate the corresponding top and bottom ears 22 is provided with a forwardly projecting and preferably integrally formed flange 110 thereon. Extending between the flanges 110 and supported thereby are a pair of vertically spaced horizontal rods 112 and 114, respectively, axially slidably received in the flanges 110. Midway between their ends the rods 112 and 114 receive and support thereon a block 116 fixed thereto against movement axially thereof. The rods 112 and 114 are of greater length than required to span the distance between the flanges 110 and project beyond each thereof. At least one of the rods, shown as the upper rod 112, is provided with threaded end portions upon which a circular nut 118 is threadably received. The nuts 118 are preferably peripherally provided with a circular scale as indicated in Figs. 1 and 2 so calibrated as to indicate longitudinal shifting movement of the rod 112 accurately in, for instance, one thousandth of an inch, and thereby serve as indicators.

A slide bar support 120, which may be identical to the slide bar support 92, and having a centrally located rearwardly projecting pivot post 122 is positioned immediately forwardly of the block 116 with the post 122 thereof rotatably received within a suitable bore 124 provided in the block 116. As in the case of the slide bar support 92 the support 120 at each end is provided with a forwardly extending arm or lug 126 between which extends and is fixed a slide bar 128 arranged in parallel relation with respect to the plane of thickness of the supporting plate 20. The slide bar 128 slidably receives thereon an eye slide 130 provided with a forwardly projecting cylindrical post 132 which is rotatably received in the same bore 88 of the cross-bar 86 that the post 90 of the slide bar 96 is received. The slide bar 128 thus acts through the eye slide 130, cross-bar 86, and rods 82 to control the lateral position of the face member 30 and parts carried thereby on the transverse slide rods 24.

From the above description it will be appreciated that if the slide bar 128 is positioned with its axis vertical, then when the rods 82 are moved vertically no lateral movement of the face member 30 on the rods 24 will occur. It will likewise be appreciated that if the slide bar 128 is positioned with its axis at an angle to the vertical, for instance at the angle illustrated in Fig. 1, then as the bars 82 are raised, carrying the cross-bar 86 vertically therewith, the slide bar 128 acting through the eye slide 130 and post 132 will cause the cross-bar 86 to move laterally with respect to the plate member 20, causing the rods 82 to correspondingly move laterally and the latter acting through the lugs or ears 80 and arms 32 to cause the face member 30 to move laterally a corresponding distance on the rods 24.

It will be appreciated that the angularity of the axis of the slide bar 128 with respect to a vertical line when viewed in front elevation as indicated in Fig. 1, will determine the extent of lateral movement of the face member 30 and parts carried thereby during a complete stroke of the rods 82 in either direction and that the direction which the upper end of the slide bar 128 is swung, either to the right or left as viewed in Fig. 1 with respect to a vertical line passing through its midpoint, will determine whether the face member 30 and parts carried thereby is moved in either one direction or another during movement of the rods 82 in the same direction. It will be equally appreciated that with the slide bar 128 positioned at one angle to the vertical during both an up and down movement of the rods 82, during movement in an upward direction the face member 30 will be shifted laterally in one direction and during movement of the rods 82 in the opposite direction the face member 30 will be shifted laterally in the opposite direction.

The slide bar 128 being mounted for rotation about the axis of the post 122 it is, therefore, readily adjusted to vary the angle existing between its axis and a vertical line intersecting the same to vary the amount of lateral movement of the face member 30 during a complete reciprocatory movement of the rods 82, and it will also be appreciated that means must be provided for locking the post 122 against relative rotation in the block 116 once the desired angularity of the slide bar 128 has been established. While any suitable means may be provided for this purpose, in Fig. 2 by way of illustration such means is more or less diagrammatically illustrated as consisting of a thumb screw 134 threaded through one side face of the block 116 and into interengaging relationship with respect to the post 122 within the bore 124.

When it is desired to vary the angularity of the slide bar 128, the thumb screw 134 is loosened and while the eye slide 130 at one limit of its relatively reciprocable movement on the slide bar 128 and while the face member is locked against movement on the rods 24, shown more or less diagrammatically as by means of a thumb screw 136 threaded downwardly into the upper right leg 32, as viewed in Fig. 1, and into binding engagement with the upper rod 24, the nuts 118 on the rods 112 may both be turned in the same direction of rotation to shift the rods 112 and 114 and consequently the block 116 and post 122 in one lateral direction or the other, thus causing the slide bar 128 to swing about the axis of the post 122. When the desired angularity of the slide bar 128 has been established by this means the thumb screw 134 may be tightened to lock the slide bar in its thus adjusted position and the thumb screw 136 loosened to free the face member 30 for movement on the rods 24.

The lateral movement of the head or face member 30 together with the platten 50 and the work supported thereby obtained by the mechanism last above described is relied upon to vary the radial distance between the axis of the shaft 48 and consequently the center of the work, and the cutting tool which operates upon the periphery of the work to form the cam surface thereon. Consequently, the cutting edge of such cutting tool is positioned to engage the work preferably on a horizontal line intersecting the axis of the shaft 48, such cutting tool being more or less diagrammatically illustrated in Fig. 1 at 140 and intended to illustrate a shaper or nibbler tool reciprocating in a direction perpendicular to the plane of the drawing.

As in the case of the adjustment of the slide bar 96 the adjustment indicating means may be constructed to read directly in the amount of movement of the work required. For instance, it will be appreciated that if an inch of rise or fall of the cam surface is desired for a full reciprocation of the rods 82, then the eye slide 130 must shift transversely during a full stroke on the slide bar 128 a distance of one inch. In order to adjust the slide bar 128 from a vertical position to a position required to provide for an inch rise or fall of a cam surface it will be necessary to shift the block 116 half of this distance. Therefore, if the indicator nuts 118 are calibrated to read twice the amount of actual shifting of the block 116 as a result of adjustment of the indicator nuts 118, upon rotation of the indicator nuts 118 through a sufficient number of turns to indicate a movement of one inch thereon, the slide bar 128 will have been shifted to the required angle to actually effect an inch transverse shifting movement of the work during a complete reciprocation of the rods 82. By this means the actual rise or fall may be read directly from the indicator nuts 118 during adjustment thereof and this eliminates any requirement whatever for calculating the angularity of the slide 128 with respect to the vertical to obtain a desired amount of rise or fall of a cam surface.

From the foregoing it will be appreciated that in accordance with the present invention vertical movement of the rods 82 is relied upon to impart both rotation to the work and bodily shiftable movement of the work with respect to the cutting tool to obtain the desired angular extent of a cam surface and the desired rise or fall thereof. It will also be appreciated that the desired angular extent of a cam surface formed during one complete reciprocatory movement of the rods 82 may be readily and quickly varied to correspond to that desired by simply varying the angularity of the slide bar 96 as described. It will also be appreciated that the extent of rise or fall of a cam surface being formed on the workpiece will be determined by the angularity of the axis of the slide bar 128 with respect to a vertical line intersecting the same and which angularity may be readily varied as above described to accommodate any desired value in this respect, and that the formation of a rise, as differentiated from a fall for instance, will be governed by whether the upper end of the slide bar 128 is disposed either to the right or left of such vertical line and depending upon the direction of reciprocation of the rods 82.

In the latter respect it will be appreciated that in all events the rate of rotation of the workpiece will at all times be proportional to the rate of movement of the rods 82 regardless of the angularity of the slide bar 96 and likewise the lateral movement of the work with respect to the cutter will be proportional to the movement of the rods 82. Consequently any cam surface formed on the work by the apparatus described, and whether it be a rise or a fall, will be a constant rise or fall in every case. Because of the fact that the rotation of the work and its lateral movement towards and from a cutter is controlled through the sliding movement of the eye slide 98 on the slide bar 96 and the eye slide 130 on the slide bar 128, respectively, and in view of the accuracy with which such slide bars may be formed, it will be appreciated that extremely accurate results may be obtained in every case. Furthermore, because of the ready adjustment of the slide bars 96 and 128 to vary the angular extent in rise or fall of a cam surface, the machine is quickly and readily changed to produce cams of various sizes, that vary in angular extent of cam surfaces, and that vary in amounts of rise or fall, and that in every case where reasonable care is taken in setting up the machine for each operation an extremely accurate formed product will result.

One thing to be noted is that because of the ability to adjust the slide bar 96 to effect any amount of angular rotation of the workpiece up to a complete revolution of the same during one complete stroke of the rods 82, the apparatus is capable of forming cams having consecutive and either contiguous or spaced cam surfaces, which may be either rises or falls or any suitable combination thereof, of any desired angular extent and of any desired rise or fall, by suitable variation in the angularity of the slide bars 96 and/or 128 as may be required under the circumstances.

Any suitable means may be employed for reciprocating the rods 82, a hydraulic piston and cylinder assembly indicated generally at 150 being illustrated in the drawings as provided for this purpose. It will be appreciated that if the cylinder and piston assembly 150 is mounted upon or fixed with respect to the front face member 30 it may be rigidly fixed with respect thereto, but that if it is fixed in relation to the mounting or supporting plate 20 then a laterally slidable connection between the rods 82 and the cylinder and piston assembly 150 must be provided to permit the lateral movement of the rods 82 occasioned by angular adjustment of the slide bar 128. This latter form of construction is shown by way of illustration and, accordingly, the upper ends of the rods 82 are shown rigidly connected by means of a cross-bar 152 having a central longitudinally extending slot 154 therein. The piston rod 156 of the assembly 152 projects down through the slot 154 and is provided with a plate member 158 fixed thereto both above and below the bar 152 for sliding engagement therewith. Preferably ball bearings 160 are interposed between each plate 158 and the opposed face of the member 152 to reduce the amount of friction resisting relative sliding movement between the member 152 and the plate members 158. The cylinder and piston assembly 150 may, of course, be suitably or conventionally controlled to vary the rate and direction of movement of the piston rod 156 as desired.

Figure 10:
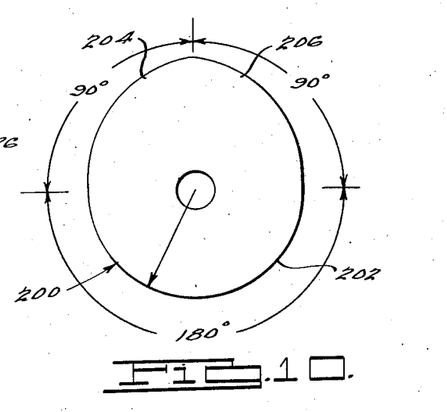

In order to permit a better understanding of the invention and to more fully explain the various adjustments thereof necessary in the formation or development of a cam, in Figs. 4 to 9, inclusive, there is illustrated more or less diagrammatically the apparatus shown in Figs. 1 to 3, inclusive, and the various adjusted positions thereof required in the formation or development of a simple type of cam such as is shown in Fig. 10. The cam shown in Fig. 10 is a simple, single lobe type indicated generally at 200 and as having a truly circular portion 202 extending about its axis through an arc of 180 degrees, therefore being semi-circular, a single rise portion 204 having an angular extent of 90 degrees and a fall portion 206 likewise having an angular extent of 90 degrees. The amount of rise and fall over the portion 204 and 206 will, of course, be the same under the conditions assumed and, of course, may be any value within the limits of the machine.

Figures 5, 7:
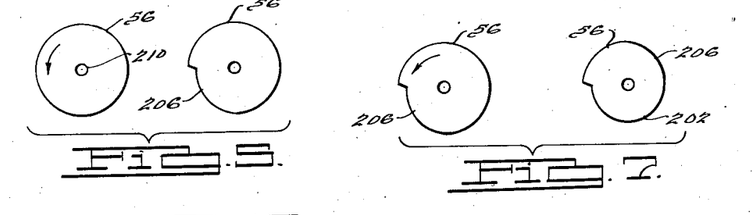
Fig. 5 is a front elevational view of the work blank at the beginning of the operation to which the machine is shown adjusted in Fig. 4 and also a view thereof after the completion of the operation of the machine as adjusted in Fig. 4.
Fig. 7 is a view of the work blank in the condition it is in when at the start of the operation for which the machine is adjusted for in Fig. 6 and also a view of the work blank in the condition which it assumes upon completion of said operation.

In forming the cam 200 it may be assumed that the work blank may be the same as that illustrated in Fig. 1 and as indicated at 56 at the lefthand side of Fig. 5. In other words it will be a circular blank having a central hole 210 for reception of the arbor 52 and will be fixed against relative movement to the forward face of the platten 50 by means of the nut 54.

Figure 4:
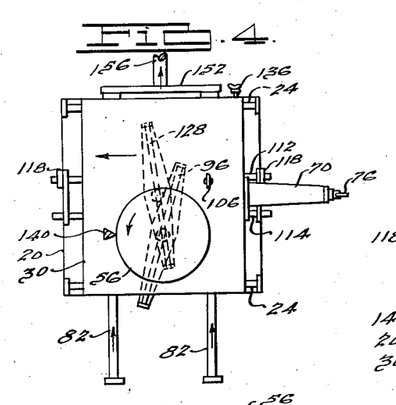
Fig. 4 is a more or less diagrammatic, front elevational view of the apparatus shown in the preceding figures in the position which it initially assumes when adjusted to form a cam of the final contour shown in Fig. 10.

The first operation will be assumed to be that required to form the fall portion 206 of the cam. Under such conditions and assuming the rods 82 to be at the bottom end of their stroke as shown in Fig. 4, the thumb nut 104 is loosened, the thumb nut 106 is tightened, and the screw 64 is rotated by means of the handle 76 until the slide bar 96 is swung to bring its upper end to the right of a vertical line passing through its midpoint and until its axis is at the angle required to rotate the workpiece or blank through an angle of 90 degrees in a counterclockwise direction of movement upon a full reciprocatory movement of the rods 82 in an upward direction. It will be recalled that in adjusting the slide bar 96 to obtain this angle of movement of the work, it is obtained by simply rotating the screw 64 after the slide bar 96 has been brought to its vertical position, in the proper direction and until the indicator ring has registered 90 degrees of rotation from such vertical position of the slide bar 96. The thumb screw 106 is then loosened and the thumb screw 104 is then tightened, thus locking the slide bar 96 in its adjusted position and freeing the slide 40 for sliding movement in the face member 30.

The slide bar 128 is then adjusted to effect the desired fall of the cam during the 90 degrees of rotation provided for by the aforementioned adjustment of the slide bar 96. This may be accomplished by loosening the thumb screw 134, tightening the thumb screw 136 and then turning the indicator nuts 118 in the same and desired direction to bring the slide bar 128 from a vertical position to the particular angle required to effect the desired lateral shifting movement of the face member 30 and consequently bodily lateral movement of the blank 56 with respect to the cutting tool 140 during a complete reciprocation of the rods 82 in an upward direction. It will be recalled here that in thus adjusting the slide bar 128 the indicator nuts 118 are simply turned until they indicate directly the desired amount of fall for the portion 206. Inasmuch as the fall portion 206 of the cam is to be formed in this operation it will be appreciated that the upper end of the slide bar 128 must in such case be swung to the left of a vertical line passing through its mid-point in the general manner illustrated in Fig. 4.

The slide bars 96 and 128 having thus been adjusted to the proper angle for cutting of the fall portion 206 of the cam 200, the front member 30 together with the blank 56 thereon will be moved laterally with respect to the cutting tool 140 to bring it to the proper starting relation with respect to the tool 140. As previously explained the particular tool 140 shown is assumed to be a shaper or a nibbler tool which is reciprocable in a direction perpendicular to the plane of the drawing.

After the relative position of the tool 140 with respect to the axis of the work has been established as above described and the slide bars 96 and 128 set at their required angles, the cutting tool 140 is set into operation and the rods 82 are caused to move upwardly by the means provided therefor, in the particular case shown assumed to be the hydraulic cylinder and piston assembly 150. The rate of movement of the rods 82 will, of course, be commensurate with the desired feeding movement between the cutting tool 140 and the work and will be continued until the rods 82 reach the upper limit of their movement. The work blank 56 in such case will have been rotated through an angle of 90 degrees about its axis and the front member 30 and the blank carried thereby will have moved to the left, as viewed in Fig. 4, an amount equal to the desired fall over the portion 206 of the cam. Upon the completion of this phase of movement the workpiece 56 will assume the condition illustrated at the righthand part of Fig. 5 in which it will be noted that a portion of the peripheral surface of the workpiece will have been cut away to the form and to the dimensions desired for the fall portion 206 of the final cam 200.

Figure 6:
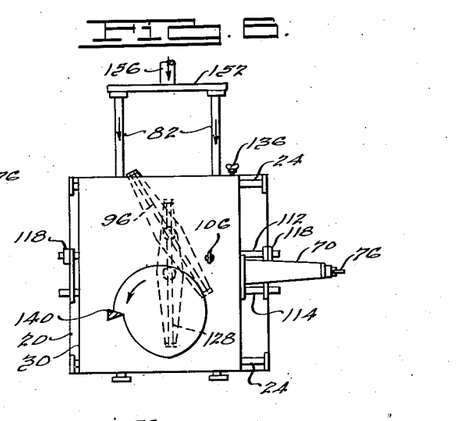
Fig. 6 is a view similar to Fig. 4 but illustrating the machine in the position which it assumes at the end of the operation for which it is adjusted in Fig. 4 and re-adjusted for the second phase of oeration.

Upon the completion of the operation illustrated in Figs. 4 and 5, the operation illustrated in Figs. 6 and 7 may then be carried out. In this operation the blank will initially be in the condition illustrated at the lefthand side of Fig. 7 and which, of course, is identical to that illustrated at the righthand side of Fig. 5. It will be assumed that in this case, and as ordinarily will be desirable, that the blank will continue to rotate in the same direction during the entire operation so that in the present case the blank will continue to rotate in a counterclockwise direction as viewed in Fig. 6 and, accordingly, will require that the semi-circular portion 202 of the cam 200 be formed during this operation. In view of the fact that the rods 82 will in this case be moving downwardly it will be appreciated that it will be necessary to swing the upper end of the slide bar 96 to the opposite side of a vertical line passing through its center line from the position which it assumed during the first operation and that in this case, in view of the fact that the work blank must be rotated through an angle of 180 degrees, the angle of the slide bar 96 with respect to such vertical line must be sufficiently increased to obtain this desired degree of rotatable movement. Its relation in such case will be approximately that illustrated in Fig. 6, and it may be shifted to such position in the same general manner as was previously described to bring it to the position illustrated in Fig. 4. It will also be appreciated that in this case, due to the fact that the semi-circular portion 202 of the cam involves no rise or fall, that the slide bar 128 will be swung to a vertical position so that no bodily shiftable movement of the front member 30 and workpiece in a lateral direction will occur during this phase of operation. The slide bar 128 may be swung to such vertical position in the same general manner as previously described to bring it to the position illustrated in Fig. 4. It will also be appreciated that during adjustments of the slide bars 96 and 128 as just described the thumb screw 136 may be tightened to lock the front member 30 against lateral movement on the rods 24 so as to prevent any possible inadvertent lateral shifting movement of the front member 30 from occurring during such adjustment.

The above described adjustments having been made, the cutting tool 140 is again set in operation and the rods 82 are caused to move downwardly at the desired rate of feed, the work blank 56 thus being caused to continue its rotation in a counterclockwise direction of rotation without any lateral shifting movement between the work and the cutting tool so that by the time the rods 82 have reached the bottom limit of their reciprocable positions the semi-circular portion 202 of the cam 200 will have been formed and the blank will have assumed the condition illustrated at the righthand side of Fig. 7.

Figure 8:
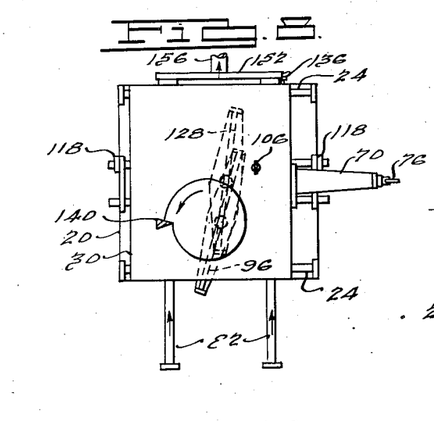
Fig. 8 is a view similar to Figs. 4 and 6 but illustrating the machine in the position which it assumes after completion of the operation for which it is adjusted in Fig. 6 and after it has been re-adjusted for the final operation on the work blank to form the cam shown in Fig. 10.
Figure 9:
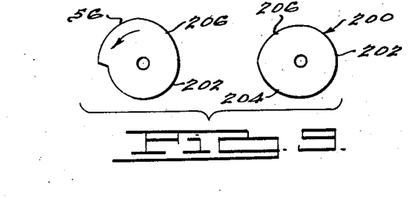
Fig. 9 is a view showing the work blank in the form which it assumes before the operation of the machine adjusted as indicated in Fig. 8 is commenced and also a view of the work blank in the form which it assumes upon completion of such operation; and, Fig. 10 is a relatively enlarged, more or less diagrammatic view illustrating the final form of the cam formed as a result of the operations of the machine adjusted to the various positions indicated in Figs. 4, 6, and 8.

The remaining operation on the blank is, of course, that required to form the rise portion 204 which is assumed to be of the same angular extent as the portion 206 and an equal amount of rise. The stroke of the rods 82 will be upward under such conditions. In such case and as illustrated in Fig. 8, in view of the fact that the blank will be rotated through the same angular extent as required in the operation shown in Fig. 4, the slide bar 96 will be re-adjusted to bring it to the same position that it assumed in the operation disclosed in Fig. 4, such adjustment being made in substantially the same manner as previously described. However, in this case in view of the fact that it is the rise portion 204 of the cam which is to be formed the slide bar 128, while requiring to be adjusted to the same angularity with respect to a vertical line passing through its axis as in the operation in Fig. 4, will require that its upper end be swung to the opposite side of such vertical line and this is the condition in which it is shown in Fig. 8. These adjustments having been made, then the rods 82 are fed upwardly at the required or desired rate of feed and the blank, which at the initiation of such operation assumed the condition illustrated at the lefthand side of Fig. 9 will, when completed, assume the condition illustrated at the righthand side of Fig. 9 and which, it will be recognized, is the final condition thereof as shown in enlarged scale in Fig. 10.

The above description of the operations followed in constructing the cam 200 as brought out in Figs. 4 to 10, inclusive, of course relates to the adjustment of the machine in the production of a most simple type of cam. However, it is believed that those skilled in the art will recognize from such description the relatively easy manner in which the machine may be adjusted and utilized to form cams of any desired size and having any desired number and angular extent of rise and fall portions. It is also believed that those skilled in the art will appreciate from the description of the operation described in connection with Figs. 4 to 10, inclusive, that any desired numbers of cams of various conformation involving constant rises or falls may be relatively quickly and easily constructed in an exceedingly accurate manner by the use of apparatus constructed in accordance with the present invention.

Having thus described our invention, what we claim by Letters Patent is:

1. Cam forming mechanism comprising, in combination, a rotatable work support, a pair of members arranged for relative sliding movement with respect to each other in a straight line, means interconnecting one of said members to said work support for effecting rotation of the latter upon sliding movement of the former with respect to its associated part, a second pair of parts arranged for sliding movement in a straight line, means interconnecting one of the last-mentioned parts with said work support for effecting bodily shiftable movement of said work support in a direction transverse to the axis of rotation thereof upon relative sliding movement of said one of the last-mentioned parts with respect to its associated part, and means for effecting relative sliding movement between said pair of parts.

2. Cam forming mechanism comprising, in combination, a support, a work support rotatably carried by the first-mentioned support for bodily shiftable movement transversely of the axis of rotation thereof, a pair of parts relatively slidably associated with each other for straight line movement, means interconnecting one of said parts to said work support for effecting rotation of the latter upon relative sliding movement between said parts, a second pair of parts relatively slidably associated with each other for straight line movement, means operable to connect one of the last-mentioned parts against movement to said first-mentioned support, means interconnecting the other of said last-mentioned parts to said work support for effecting bodily shiftable movement thereof upon relative sliding movement between said last-mentioned pair of parts, and means for effecting simultaneous sliding movement between said pairs of relatively slidable parts.

3. In a cam forming mechanism, in combination, a support, a face member mounted on said support for bodily shiftable movement transversely thereof, a work support rotatably supported by said face member, a pair of parts arranged for relative slidable movement with respect to each other in a straight line, a rack member slidably mounted on said face member, means operatively interconnecting said rack member with said work support operable to translate the slidable movement of said rack member into rotary movement of said work support, means interconnecting one of said slidable parts with said rack members, a second pair of parts arranged for relative slidable movement with respect to each other in a straight line, means for securing one of said parts against movement relative to the first-mentioned support, means interconnecting the other of said last-mentioned pair of parts to said face member whereby to control the lateral shiftable position of said face member with respect to said first-mentioned support, means operatively interconnecting the other of the first-mentioned pair of parts and said other of said last-mentioned pair of parts together for simultaneous movement in a direction transverse to the direction of movement of said face member relative to said first-mentioned support, and means for effecting said simultaneous movement.

4. In a cam forming mechanism, in combination, a support, a face member mounted on said support for bodily movement transversely thereof, a slide carried by said face member, a work support rotatably mounted on said face member, means operatively interconnecting said slide and work support for translating sliding movement of said slide into rotary movement of said work support, a pair of parts arranged for relative sliding movement with respect to each other in a straight line, means connecting one of said parts to said slide, means guiding the other of said parts for movement in the plane of shiftable movement of said face member on said support and in a direction transverse to the direction of shiftable movement of said face member on said support, a second pair of parts slidably associated with each other for movement in a straight line, means for securing one of said second pair of parts against movement with respect to the first-mentioned support, means for fixing the other of said second pair of parts with respect to said other of said first-mentioned pair of parts for simultaneous movement therewith, and means for moving said others of said pairs of parts.

5. In a cam forming mechanism, in combination, a support, a face member mounted on said support for bodily movement transversely thereof, a slide carried by said face member, a work support rotatably mounted on said face member, means operatively interconnecting said slide and work support for translating sliding movement of said slide into rotary movement on said work support, a pair of parts arranged for relative sliding movement with respect to each other in a straight line, means connecting one of said parts to said slide, means for shifting the point of connection of said one of said parts and said slide longitudinally of said slide, means guiding the other of said parts for movement in the plane of shiftable movement of said face member on said support and in a direction transverse to the direction of shiftable movement of said face member on said support, a second pair of parts slidably associated with each other for movement in a straight line, means for securing one of said second pair of parts against movement with respect to the first-mentioned support, means for fixing the other of said second pair of parts with respect to said other of said first-mentioned pair of parts for simultaneous movement therewith, and means for moving said others of said pairs of parts.

6. In a cam forming mechanism, in combination, a support, a face member mounted on said support for bodily movement transversely thereof, a slide carried by said face member, a work support rotatably mounted on said face member, means operatively interconnecting said slide and work support for translating sliding movement of said slide into rotary movement of said work support, a pair of parts arranged for relative sliding movement with respect to each other in a straight line, means connecting one of said parts to said slide, means for releasably locking said slide against movement with respect to said face member, means guiding the other of said parts for movement in the plane of shiftable movement of said face member on said support in a direction transverse to the direction of shiftable movement of said face member on said support, a second pair of parts slidably associated with each other for movement in a straight line, means for securing one of said second pair of parts against movement with respect to the first-mentioned support, means for fixing the other of said second pair of parts with respect to said other of said first-mentioned pair of parts for simultaneous movement therewith, and means for moving said others of said pairs of parts.

7. In a cam forming mechanism, in combination, a support, a face member mounted on said support for bodily movement transversely thereof, a slide carried by said face member, a work support rotatably mounted on said face member, means operatively interconnecting said slide and work support for translating sliding movement of said slide into rotary movement of said work support, a pair of parts arranged for relative sliding movement with respect to each other in a straight line, means for adjustably varying the angularity of the line of movement between said pair of parts and the direction of movement of said face member relative to the first-mentioned support, means connecting one of said parts to said slide, means guiding the other of said parts for movement in the plane of shiftable movement of said face member on said support and in a direction transverse to the direction of shiftable movement of said face member on said support, a second pair of parts slidably associated with each other for movement in a straight line, means for securing one of said second pair of parts against movement with respect to the first-mentioned support, means for fixing the other of said second pair of parts with respect to said other of said first-mentioned pair of parts for simultaneous movement therewith, and means for moving said others of said pairs of parts.

8. In a cam forming mechanism, in combination, a support, a face member mounted on said support for bodily movement transversely thereof, a slide carried by said face member, a work support rotatably mounted on said face member, means operatively interconnecting said slide and work support for translating sliding movement of said slide into rotary movement of said work support, a pair of parts arranged for relative sliding movement with respect to each other in a straight line, means for adjustably varying the angularity of the line of movement between said pair of parts and the direction of movement of said other of said pair of parts, means connecting one of said parts to said slide, means for shifting the point of connection of said one of said parts and said slide longitudinally of said slide, means for releasably locking said slide against movement with respect to said face member, means guiding the other of said parts for movement in the plane of shiftable movement of said face member on said support and in a direction transverse to the direction of shiftable movement of said face member on said support, a second pair of parts slidably associated with each other for movement in a straight line, means for securing one of said second pair of parts against movement with respect to the first-mentioned support, means for fixing the other of said second pair of parts with respect to said other of said first-mentioned pair of parts for simultaneous movement therewith, and means for moving said others of said pairs of parts.

9. In a cam forming mechanism, in combination, a support, a face member mounted on said support for bodily movement transversely thereof, a slide carried by said face member, a work support rotatably mounted on said face member, means operatively interconnecting said slide and work support for translating sliding movement of said slide into rotary movement of said work support, a pair of parts arranged for relative sliding movement with respect to each other in a straight line, means connecting one of said parts to said slide, means guiding the other of said parts for movement in the plane of shiftable movement of said face member on said support and in a direction transverse to the direction of shiftable movement of said face member on said support, a second pair of parts slidably associated with each other for movement in a straight line, means for varying the angularity of the direction of movement of said last-mentioned pairs of parts with respect to the direction of movement in which said other of said first-mentioned pairs of parts is guided, means for securing one of said second pair of parts against movement with respect to the first-mentioned support, means for fixing the other of said second pair of parts with respect to said other of said first-mentioned pair of parts for simultaneous movement therewith, and means for moving said others of said pairs of parts.

10. In a cam forming mechanism, in combination, a support, a face member mounted on said support for bodily movement transversely thereof, a slide carried by said face member, a work support rotatably mounted on said face member, means operatively interconnecting said slide and work support for translating sliding movement of said slide into rotary movement on said work support, a pair of parts arranged for relative sliding movement with respect to each other in a straight line, means connecting one of said parts to said slide, means for releasably locking said slide against movement with respect to said face member, means guiding the other of said parts for movement in the plane of shiftable movement of said face member on said support and in a direction transverse to the direction of shiftable movement of said face member on said support, a second pair of parts slidably associated with each other for movement in a straight line, means for varying the angularity of the direction of movement of said last-mentioned pairs of parts with respect to the direction of movement in which said other of said first-mentioned pairs of parts is guided, means for securing one of said second pair of parts against movement with respect to the first-mentioned support, means for fixing the other of said second pair of parts with respect to said other of said first-mentioned pair of parts for simultaneous movement therewith, and means for moving said others of said pairs of parts.

11. In a cam forming mechanism, in combination, a support, a face member mounted on said support for bodily movement transversely thereof, a slide carried by said face member, a work support rotatably mounted on said face member, means operatively interconnecting said slide and work support for translating sliding movement of said slide into rotary movement on said work support, a pair of parts arranged for relative sliding movement with respect to each other in a straight line, means connecting one of said parts to said slide, means for shifting the point of connection of said one of said parts and said slide longitudinally of said slide including a screw and means for indicating rotation thereof reading directly in degrees of corresponding rotatable movement of said work support, means guiding the other of said parts for movement in the plane of shiftable movement of said face member on said support and in a direction transverse to the direction of shiftable movement of said face member on said support, a second pair of parts slidably associated with each other for movement in a straight line, means for securing one of said second pair of parts against movement with respect to the first-mentioned support, means for fixing the other of said second pair of parts with respect to said other of said first-mentioned pair of parts for simultaneous movement therewith, and means for moving said others of said pairs of parts.

12. In a cam forming mechanism, in combination, a support, a face member mounted on said support for bodily movement transversely thereof, a slide carried by said face member, a work support rotatably mounted on said face member, means operatively interconnecting said slide and work support for translating sliding movement of said slide into rotary movement of said work support, a pair of parts arranged for relative sliding movement with respect to each other in a straight line, means connecting one of said parts to said slide, means guiding the other of said parts for movement in the plane of shiftable movement of said face member on said support and in a direction transverse to the direction of shiftable movement of said face member on said support, a second pair of parts slidably associated with each other for movement in a straight line, means for varying the angularity of the direction of movement of said last-mentioned pairs of parts with respect to the direction of movement in which said other of said first-mentioned pairs of parts is guided including a screw and means for indicating rotation thereof reading directly in amounts of rise or fall of cam surfaces being formed by said mechanism, means for securing one of said second pair of parts against movement with respect to the first-mentioned support, means for fixing the other of said second pair of parts with respect to said other of said first-mentioned pair of parts for simultaneous movement therewith, and means for moving said others of said pairs of parts.

13. In a cam forming mechanism, in combination, a support, a face member mounted on said support for bodily movement transversely thereof, a slide carried by said face member, a work support rotatably mounted on said face member, means operatively interconnecting said slide and work support for translating sliding movement of said slide into rotary movement of said work support, a pair of parts arranged for relative sliding movement with respect to each other in a straight line, means connecting one of said parts to said slide, means guiding the other of said parts for movement in the plane of shiftable movement of said face member on said support and in a direction transverse to the direction of shiftable movement of said face member on said support, means for varying the angularity of said other of said parts including a screw and means for indicating rotation thereof reading directly in degrees of corresponding rotatable movement of said work support, a second pair of parts slidably associated with each other for movement in a straight line, means for varying the angularity of the direction of movement of said last-mentioned pairs of parts with respect to the direction of movement in which said other of said first-mentioned pairs of parts is guided including a screw and means for indicating rotation thereof reading directly in amounts of rise or fall of cam surfaces being formed by said mechanism, means for securing one of said second pair of parts against movement with respect to the first-mentioned support, means for fixing the other of said second pair of parts with respect to said other of said first-mentioned pair of parts for simultaneous movement therewith, and means for moving said others of said pairs of parts.

GEORGE L. ATHERHOLT, Sr.
ENOS P. SAUNDERS.
LEWIS P. GRAHAM.